(12) United States Patent
Arnold

(10) Patent No.: US 7,065,826 B1
(45) Date of Patent: Jun. 27, 2006

(54) CYCLONIC BAGLESS VACUUM CLEANER WITH SLOTTED BAFFLE

(75) Inventor: Adrian Christopher Arnold, ACIS Shortacre, Brentor, Devon (GB) PL19 0NG

(73) Assignees: Euro Pro Operating, LLC, West Newton, MA (US); Adrian Christopher Arnold, Brentor (GB)

( * ) Notice: Subject to any disclaimer, the term of this patent is extended or adjusted under 35 U.S.C. 154(b) by 244 days.

(21) Appl. No.: 10/348,076

(22) Filed: Jan. 21, 2003

(51) Int. Cl.
*A47L 9/16* (2006.01)
*B01D 45/12* (2006.01)

(52) U.S. Cl. ............................. 15/353; 55/343; 55/345; 55/424

(58) Field of Classification Search ................ 15/327.1, 15/327.2, 327.6, 327.7, 347, 350–353; 55/337, 55/343, 345, 423, 424, 459.1, 466, DIG. 3
See application file for complete search history.

(56) References Cited

U.S. PATENT DOCUMENTS

| 535,099 | A | | 3/1895 | Gale et al. |
|---|---|---|---|---|
| 2,290,664 | A | | 7/1942 | Allardice |
| 3,200,568 | A | * | 8/1965 | McNeil ........................ 96/195 |
| 3,513,642 | A | | 5/1970 | Cornett |
| 3,543,325 | A | * | 12/1970 | Hamrick ....................... 15/314 |
| 3,870,489 | A | | 3/1975 | Shaddock |
| 4,210,430 | A | | 7/1980 | Galow et al. |
| 4,375,365 | A | | 3/1983 | Muller et al. |
| 4,571,772 | A | | 2/1986 | Dyson |
| 4,573,236 | A | | 3/1986 | Dyson |
| 4,585,466 | A | | 4/1986 | Syred et al. |
| 4,593,429 | A | * | 6/1986 | Dyson ........................ 15/353 |
| 4,664,887 | A | | 5/1987 | Engstrom |
| 4,702,846 | A | | 10/1987 | Ryynanen |
| 4,826,515 | A | | 5/1989 | Dyson |
| 4,853,011 | A | | 8/1989 | Dyson |
| 4,872,892 | A | | 10/1989 | Vartiainen et al. |
| 4,969,934 | A | | 11/1990 | Kusik et al. |
| 5,090,976 | A | * | 2/1992 | Dyson ........................ 55/337 |

(Continued)

FOREIGN PATENT DOCUMENTS

EP 0042723 12/1981

(Continued)

*Primary Examiner*—Terrence R. Till
(74) *Attorney, Agent, or Firm*—Michael I. Wolfson, Esq.; Sylvia Tan, Esq.; Greenberg Traurig LLP

(57) ABSTRACT

A dirt separation and collection container suitable for use in a bagless vacuum cleaner including two dirt separation and collection zones is provided. Dirty air enters the mid-section of the device and enters a first stage dirt separation zone including a cylindrical baffle spaced inwardly from the outer wall of the device with an inclined slot to allow coarse dirt particles and fibers to pass through and collect at the base of the outer wall of the device. The spinning air is then fed into a second stage conical separator for separating fine dirt particles and collecting them in an inner substantially cylindrical collection chamber. Air exits the conical separator and device opposite the cone opening before being drawn to the suction source. Elements may be oriented upwardly or downwardly depending upon the configuration of the housing for receiving the dirt separation and collection device.

8 Claims, 9 Drawing Sheets

U.S. PATENT DOCUMENTS

| | | | |
|---|---|---|---|
| 5,145,499 A * | 9/1992 | Dyson | 55/337 |
| 5,160,356 A | 11/1992 | Dyson | |
| 5,267,371 A * | 12/1993 | Soler et al. | 15/327.5 |
| 5,496,394 A | 3/1996 | Nied | |
| 5,846,273 A * | 12/1998 | Dyson | 55/337 |
| 5,908,493 A * | 6/1999 | Krymsky | 96/333 |
| 6,425,931 B1 * | 7/2002 | Croggon | 55/414 |
| 6,553,612 B1 * | 4/2003 | Dyson et al. | 15/340.1 |
| 6,578,230 B1 * | 6/2003 | Park et al. | 15/353 |
| 6,582,489 B1 * | 6/2003 | Conrad | 55/337 |
| 2001/0029845 A1 * | 10/2001 | Dyson et al. | 96/403 |
| 2002/0020154 A1 * | 2/2002 | Yang | 55/337 |
| 2004/0112022 A1 * | 6/2004 | Vuijk | 55/429 |

FOREIGN PATENT DOCUMENTS

| | | |
|---|---|---|
| GB | 2 266 065 | 10/1993 |
| WO | WO 96/11047 | 4/1996 |
| WO | WO 97/39244 | 10/1997 |
| WO | WO 98/55202 | 12/1998 |
| WO | WO 99/42198 | 8/1999 |

\* cited by examiner

CYCLONIC BAGLESS VACUUM CLEANER WITH SLOTTED BAFFLE

BACKGROUND OF THE INVENTION

This invention relates to dirt separation and collection devices and vacuum cleaners and, more particularly to a vacuum cleaner including a collection vessel having a first stage separation zone including a slotted baffle for separating and collecting coarse dust particles and a second stage separating zone including a frusto-conical cyclone for separating and collecting fine dirt particles.

Cyclonic vacuum cleaners have been known for some time. For example, European Patent No. EP 0 042 723 and U.S. Pat. No. 4,593,429 to James Dyson disclose a vacuum suction cleaning device including two cyclone units in series operating successively to extract dirt particles from an air flow. One of the two cyclones has a substantially frusto-conical shape serving to increase the velocity of the dirt particles so that the cyclone is capable of depositing the fine dust particles in a small diameter collection chamber relative to the diameter of the cone opening. Prior to the air entering the cyclone, dirty air enters tangentially against the wall of a cylindrical outer chamber operating as a cyclone to remove coarse dirt particles from the dirty air entering the device.

In addition to devices wherein the successive cyclones are coaxial as in the above noted publications, Dyson in U.S. Pat. No. 4,373,288 places frusto-conical cyclones side by side. In this configuration, the device is designed to remove dirt through the two cyclones operating in series. The principal objective in all these devices is to avoid the need to utilize a bag as in conventional vacuum cleaners. In these conventional devices, air is drawn through the appliance by a fan that creates a large pressure drop as the bag fills with dirt. This increase in pressure drop lowers the cleaning efficiency of the unit. It is for this reason that configurations for bagless vacuum cleaners are extremely appealing.

A bagless cleaning device is disclosed in WO 99/42198 based on PCT/GB99/00507 by the applicant herein. The full text of this publication is incorporated herein by reference. In this device dirty inlet air is passed into the upper portion of a cyclone having a cylindrical cross-section and a lower frusto-conical section. This cyclone separation stage is designed to separate fine dirt particles in a collection chamber below the cone opening. The cylindrical portion of the device includes a transition zone connected to an adjacent side chamber for collection of coarse dirt particles. In another embodiment disclosed therein, coarse dirt is collected in an outer larger cylindrical chamber surrounding the inner frusto-conical cyclone separator.

Other bagless vacuum cleaner designs are shown in a series of related applications that issued to Royal Appliance Mfg. Co. based on an application that initially issued as U.S. Pat. No. 6,003,196 on Dec. 21, 1999. These patents disclose various types of upright vacuum cleaners including an air separation chamber that may be a cyclonic separation device. All the vacuum cleaners described in these patents include a filter disposed in the cyclonic air flow chamber or dirt cup upstream of the suction source.

U.S. Pat. No. 6,192,550 to Sanyo Electric Co., Ltd. also discloses a vacuum cleaning device having a rotatable filter disposed in a cyclonic air separation chamber. This device is particularly effective, because the rotatable feature of the filter allows removal of dirt entrained in the filter into the bottom of the dirt cup for easy disposal when the dirt cup is removed for cleaning. The contents of this patent are incorporated herein by reference.

While many of these bagless designs are improvements over conventional vacuums utilizing bag technology, it remains desirable to provide continued improvements and alternative designs to improve the separation of dirt particles from air without the need to include filters in the air separator chamber or in the dirt cup.

SUMMARY OF THE INVENTION

Generally speaking, in accordance with the invention, a dirt separation and collection device for a bagless vacuum cleaner including at least a first stage cylindrical separation zone formed of a baffle having an inclined slot is provided. The separation and collection device has an elongated cylindrical container including the first stage slotted separation zone and a second stage inner frusto-conical cyclone fine dust separating cyclone, both coaxially mounted within the cylindrical container. The first stage separator is a slotted baffle or shroud with an inclined slot that removes coarse dirt particles from the dirty inlet air before the air is fed into the fine dirt cyclone separator. The slotted baffle is disposed coaxially about the cyclone separator within the dirt collection container. Dirty air enters tangentially into the interior of the slotted baffle disposed at the upper portion of the container and extends only a portion of the length of the container. Coarse dirt and fibrous materials pass through the slot thereby depositing the coarse dirt particles in the bottom of the container. Air then enters the larger cone opening to the interior of the cyclone separator wherein fine dirt particles are removed through the smaller cone opening at the opposite end and clean exhaust air is withdrawn at the center of the larger cone opening.

The cyclone separator may be disposed within the baffle with the cone opening oriented towards the lower or upper directions. Dirty air may enter the first stage separator at the top or bottom of the baffle with the slot angle being oriented clockwise or counterclockwise from top or bottom. The cylindrical dirt separation container including and inlet in the sidewall into the baffle and a coaxial cyclone with clean air withdrawn at the top is particularly well suited for use in an upright vacuum cleaner of the type disclosed in U.S. Pat. No. 6,192,550. Dirt is removed by opening the container bottom in a similar manner as described in the patent.

Accordingly, it is an object of the invention to provide a dirt separation device for a vacuum cleaner that provides greater dirt separation over existing designs.

It is another object of the invention to provide a dirt separation device including a cyclone separator disposed coaxially within a cylindrical baffle having an inclined slot.

A further object of the invention is to provide a dirt separation device including a cylindrical dirt collection chamber having a baffle with an inclined slot for removing coarse dirt and fibrous materials from the incoming dirty air stream with an inner coaxial cyclonic separator within the dirt collection chamber.

Yet another object of the invention is to provide an air separation device including a cylindrical dirt cup with a cyclonic separation device disposed coaxially within the dirt cup and a slotted baffle disposed about the cylindrical axis for removal of coarse dirt particles and fibrous material prior to inlet air entering the cyclone separator for collection of fine dirt particles.

Still other objects and advantages of the invention will in part be obvious and will in part be apparent from the specification.

The invention accordingly comprises the features of construction, combination(s) of elements, and arrangement of parts which will be exemplified in the construction(s) hereinafter set forth, and the scope of the invention will be indicated in the claims.

BRIEF DESCRIPTION OF THE DRAWINGS

For a fuller understanding of the invention, reference is had to the following description taken in connection with the accompanying drawing(s), in which.

DESCRIPTION OF THE PREFERRED EMBODIMENTS

Figure 1:
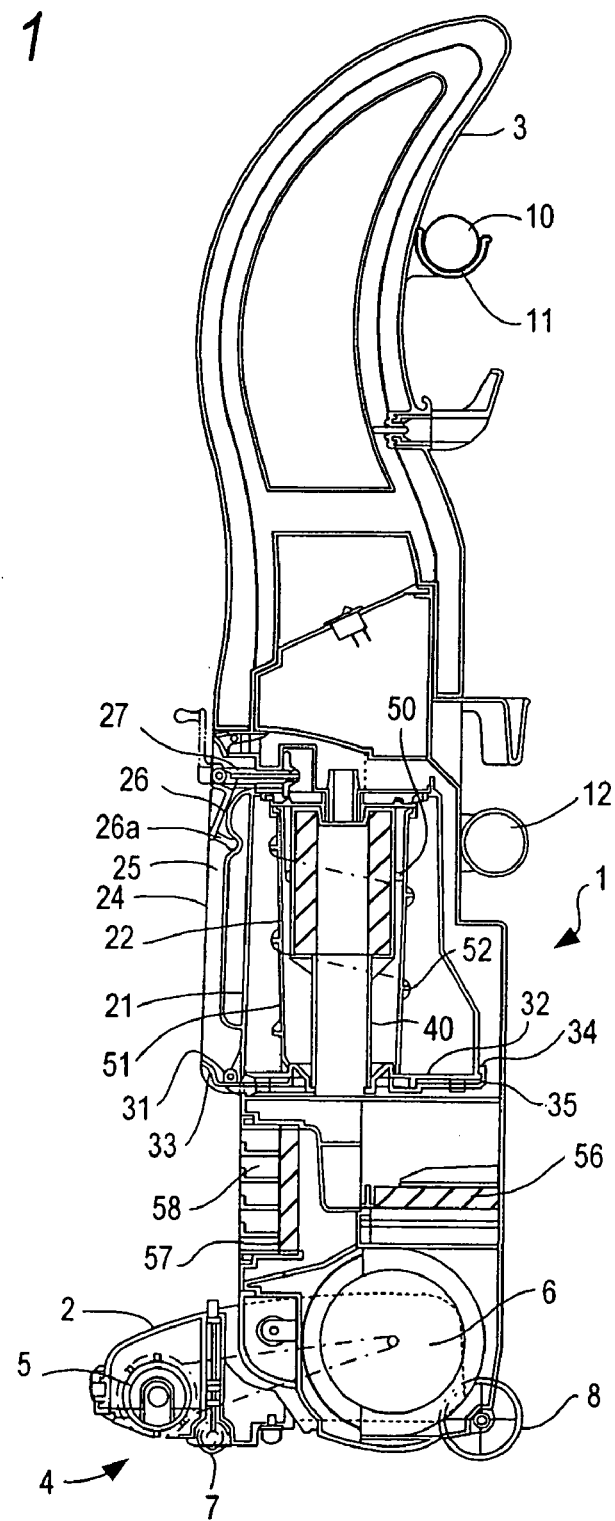
FIG. 1 is a side sectional view of an upright vacuum cleaner of the type disclosed in the prior art including a filter within a removable cylindrical cyclonic air separation and collection chamber.
Figure 2:
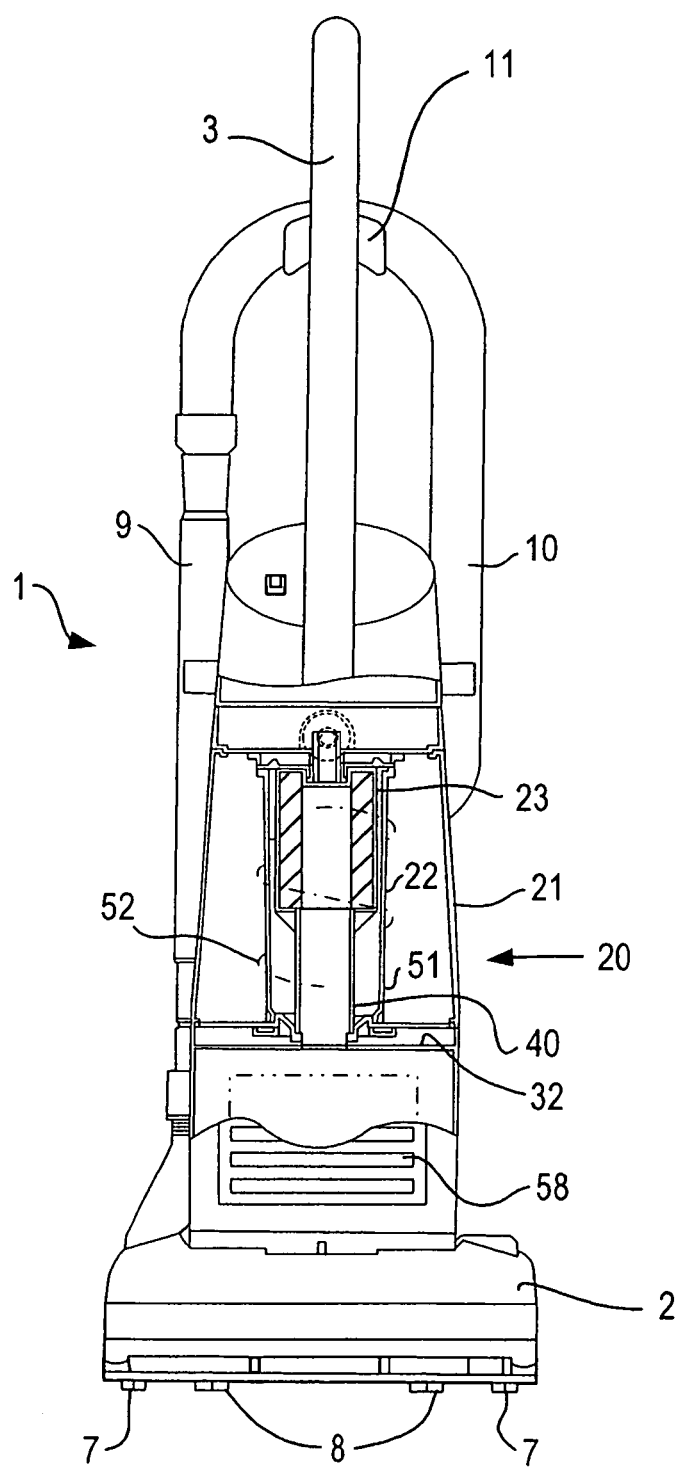
FIG. 2 is a front sectional view of the upright vacuum cleaner illustrated in FIG. 1.

FIGS. 1 and 2 illustrate a side sectional view and a front section view of the upright vacuum cleaner of the type shown in U.S. Pat. No. 6,192,550, the disclosures of which is incorporated herein by reference. Here, a suction nozzle 2 for floors is formed at a lower portion of a main body 1 of the vertical type vacuum cleaner with a handle 3 for operating main body 1 at an upper portion thereof, all of which are formed in an uniform manner.

Suction nozzle 2 for floors has a suction inlet 4 at a bottom surface side and further incorporates therein a rotating brush 5 to face suction inlet 4. Rotating brush 5 is connected to a rotating shaft of a motor fan 6 that is incorporated in the lower portion of main body 1 to be driven in a rotating manner. A pair of laterally arranged front wheels 7 are attached frontward of the bottom surface of suction nozzle 2 for floors, while a pair of laterally arranged rear wheels 8 are attached rearward of a lower portion of main body 1.

A pipe 9 is attached on either side of the suction nozzle 2 for floors that communicates with suction inlet 4. Pipe 9 extends upward along main body 1 to a tip end portion of a hose 10 in a freely attachable and detachable manner. Hose 10 is disposed to the rear surface side of the main body 1 by means of a holding portion 11 arranged on a rear surface side of the handle 3 for operating the main body and is connected to a suction cylinder 12 which is formed to be shifted to either side with respect to a center of the rear surface side.

A dust-collecting device (dust-collecting unit) 20 is fitted to a central portion on the front surface side of the main body 1 of the vacuum cleaner in a freely attachable and detachable manner. Dust-collecting device 20 includes cylindrical pre-filter 22 made of transparent resin or the like fitted into the interior of a substantially cylindrical dust-collecting case 21 made of transparent resin or the like, with a substantially cylindrical main filter 23 inside of pre-filter 22.

Dust-collecting case 21 is provided with a grip 24 at a central portion on a side that faces to the front when being attached to main body 1. Grip 24 is so arranged as to extend in a longitudinal direction in a successive manner downward to handle 3 for operating main body 1 with a groove 25 is formed on a surface of the grip 24.

A handle 26 is rotatable for rotating the pre-filter 22 is attached to an upper side of grip 24 in such a manner that it is freely foldable in a transverse direction with respect to a rotating axis 27 thereof. Handle 26 can be accumulated in groove 25 of grip 24 while a knob 26a of handle 26 is fitted to a concave portion 25a formed in groove 25 of grip 24 to be fixed thereat. It is possible to discharge dust accumulated within dust-collecting case 21 by holding grip 24, and the handle 26 can also be accumulated by efficiently utilizing the grip 24 which is not needed at the time of performing cleaning.

A clamp 28 is engaged with main body 1 when dust-collecting device 20 is fitted to main body 1 is provided on an upper side of the handle 26 of the dust-collecting device 20.

A bottom lid 32 is attached which is arranged to be freely openable and closeable by a hinge 31 provided in a lower portion of grip 24. Bottom lid 32 is so arranged that by pushing a lever 33 provided in a lower portion of the grip 24, a clamp 34 formed on an opposing side of the dust-collecting case 21 to be connected to the lever 33 is disengaged from an engaging jaw 35 to thereby release a discharge outlet 36 for the dust.

A spiral rib 52 is formed as to extend in vertical directions on an outer periphery of the pre-filter 22. The spiral rib 52 is disposed about pre-filter 22 so that dust which has accumulated and compressed within dust-collecting case 21 is pushed out in a direction of the discharge outlet when bottom lid 32 is opened for rotating the filter is rotated in a rightward direction.

Air that has been filtered of dust within dust-collecting device 20 exits through the aperture on the lower portion side of cylindrical body 40 of main filter 23 to the exterior of dust-collecting case 21. Filter air is taken in by motor fan 6 via a filter 56 shown in FIG. 1 to be exhausted through an exhaust outlet 58 formed on a lower portion of a front surface of main body 1 to the exterior by being passed from motor fan 6 through an exhaust filter 57.

Dust which has been scraped up by rotating brush 5 of the suction nozzle 2 for floors passes through pipe 9 and hose 10 into dust-collecting case 21 through suction cylinder 12 located to be shifted in either direction with respect to a center of the rear surface side of main body 1 and is made to flow downward by being revolved along the inner wall thereof while large-sized dust (coarse dust) is deposited on the bottom.

Mesh 51 of pre-filter 22 for sucking air is formed to be located downward within dust-collecting case 21. Dust that has entered together with air through suction hole 30 located upward within the dust-collecting case 21 is pushed downward by being revolved at a high speed so as to be deposited on the bottom surface (bottom lid 32) of dust-collecting case 21 in a pressed condition.

Further, small-sized dust (minute dust) enters into pre-filter 22 by passing through mesh 51 arranged in the lower portion of pre-filter 22 and is filtered by the pleat-like main filter 23. Thus, only clean air enters main filter 23 to flow downward through the motor fan 6 to be finally exhausted through the exhaust outlet 58 to the exterior.

Discharge of dust which has been accumulated in the dust-collecting case 21, by holding grip 24 of dust-collecting case 21 and drawing the case out with pushing an operating portion of clamp 28 disposed above the grip 24 upward, the dust-collecting case 21 is detached from the main body 1 of the vacuum cleaner.

By pushing a lever 33 provided in the lower portion of the dust-collecting case 21, clamp 34 is detached whereby bottom lid 32 is released to enable discharge of dust that has been accumulated in dust-collecting case 21. At this time, especially flock-like dust adheres to the inner wall of dust-collecting case 21 in a compressed state so that dust does not easily come off as it is. Thus, handle 26 is rotated in a specified direction (in this case in a rightward direction) for rotating pre-filter 22 in a specified direction whereby spiral rib 52 provided on outer periphery of pre-filter 22 acts to push out dust such as flock-like dust in a compressed state so that easy discharge is enabled.

Figure 3:
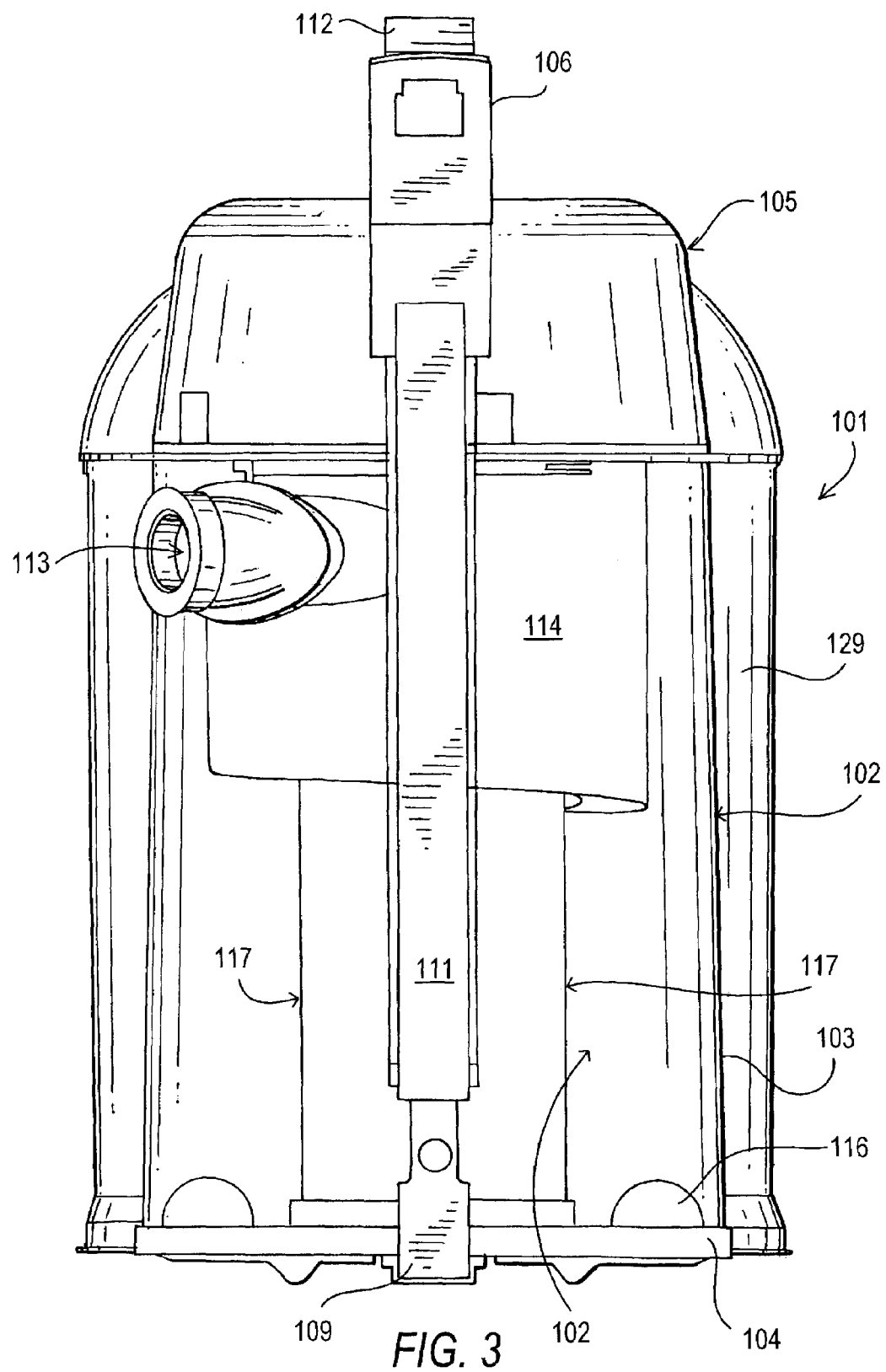
FIG. 3 is a rear elevational view in section of a transparent dirt separation and collection container with a dirty air inlet to a first stage slotted separation zone and an inner second stage coaxial cyclone separation zone constructed and arranged in accordance with the invention.

In an effort to eliminate the need for a filter in the dirt collection chamber in the type of upright vacuum shown in FIGS. 1 and 2, a two stage dirt separation and collection device 101 as shown FIG. 3 constructed in accordance with the invention may be substituted for dust collecting case 21 in main body 1. Dirt separation and collection container 101 is shown in FIGS. 3–5.

Figure 4:
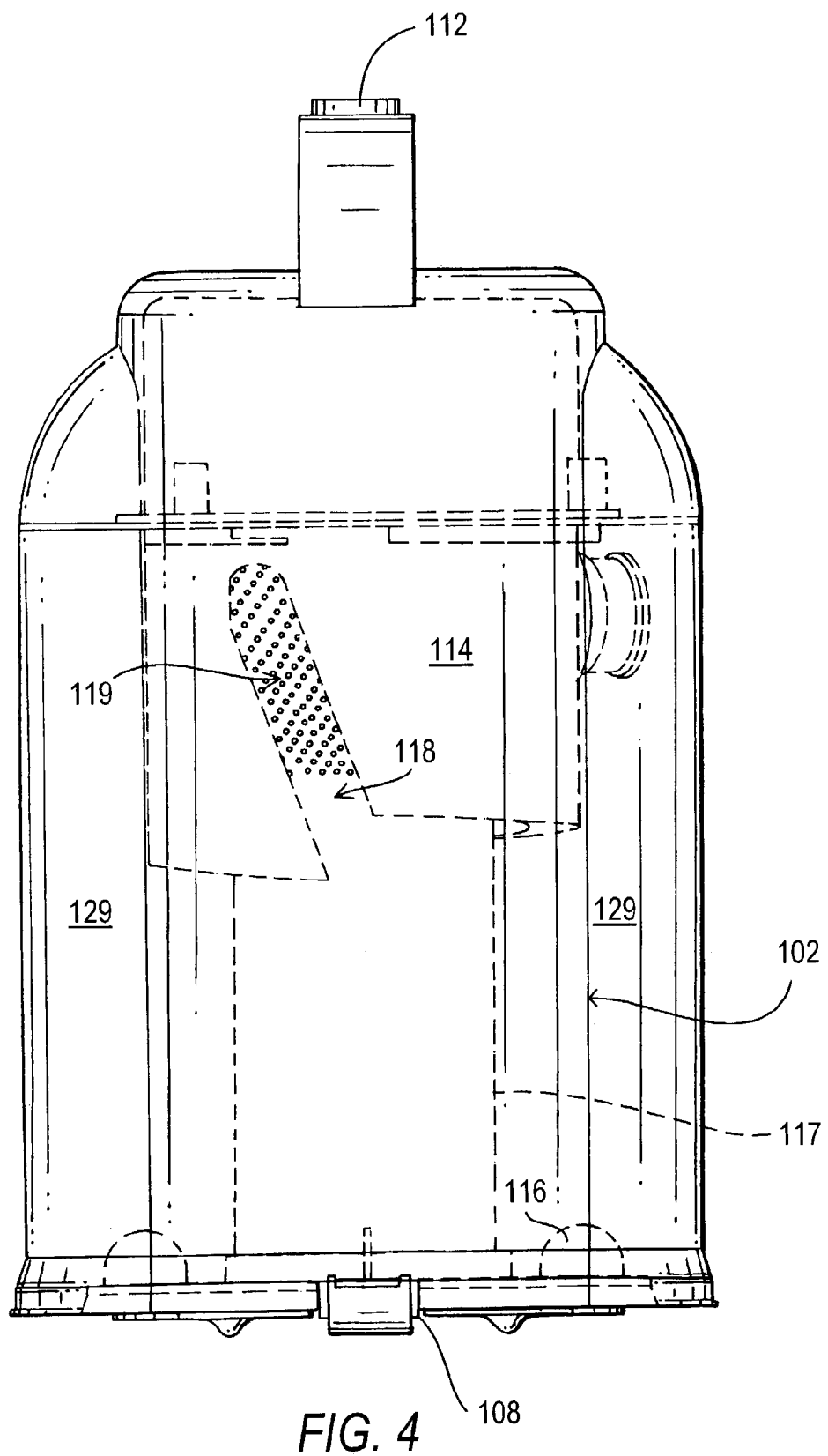
FIG. 4 is a front elevational view of the dirt separation and collection device of FIG. 3.

Referring now to FIGS. 3 and 4, dirt separation and collection container 101 includes a cylindrical collection vessel 102 formed with a substantially cylindrical sidewall 103, a selectively openable base 104 and a removable cap 105 having a carrying handle 106. A release button 112 mounted in handle 106 releases container 101 from main body 1. Base 104 is secured to sidewall 103 by a hinge 108 and s opened by a latch 109 operatively connected by a connecting rod 111 for cleaning in the same manner as described in connection with the vacuum cleaner of FIGS. 1 and 2.

Dirty air enters container 101 through an inlet 113 in sidewall 103 and enters a first stage separation zone 114. Coarse dirt separated in zone 114 is collected in the outer portion of vessel 102. A second stage cyclone separation zone 124 is coaxially disposed in a center column 117 in which fine dirt particles are collected.

Figure 5:
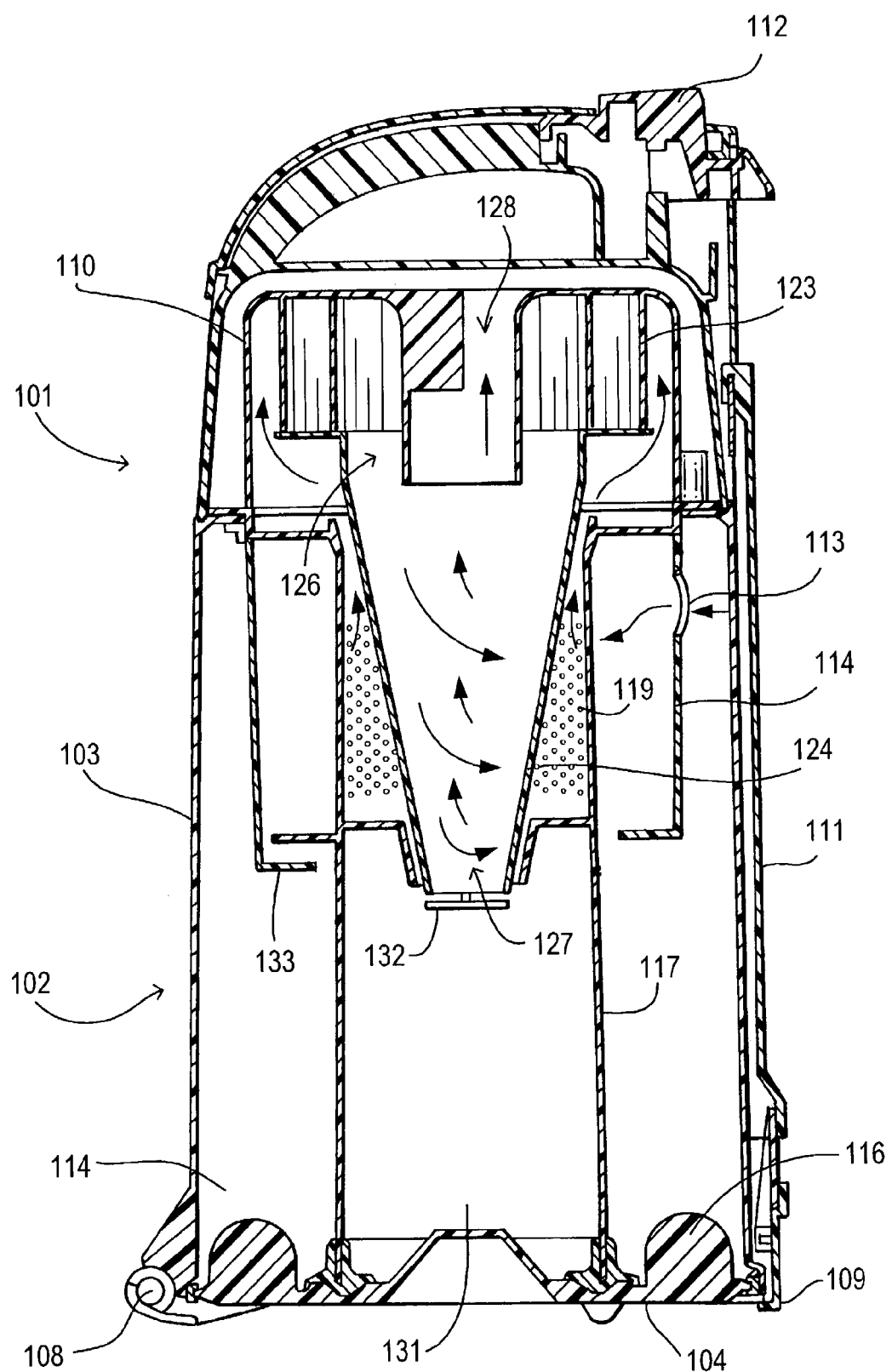
FIG. 5 is a right side elevation view in cross-section of the dirt separation and collection device of FIGS. 3 and 4.
Figure 6:
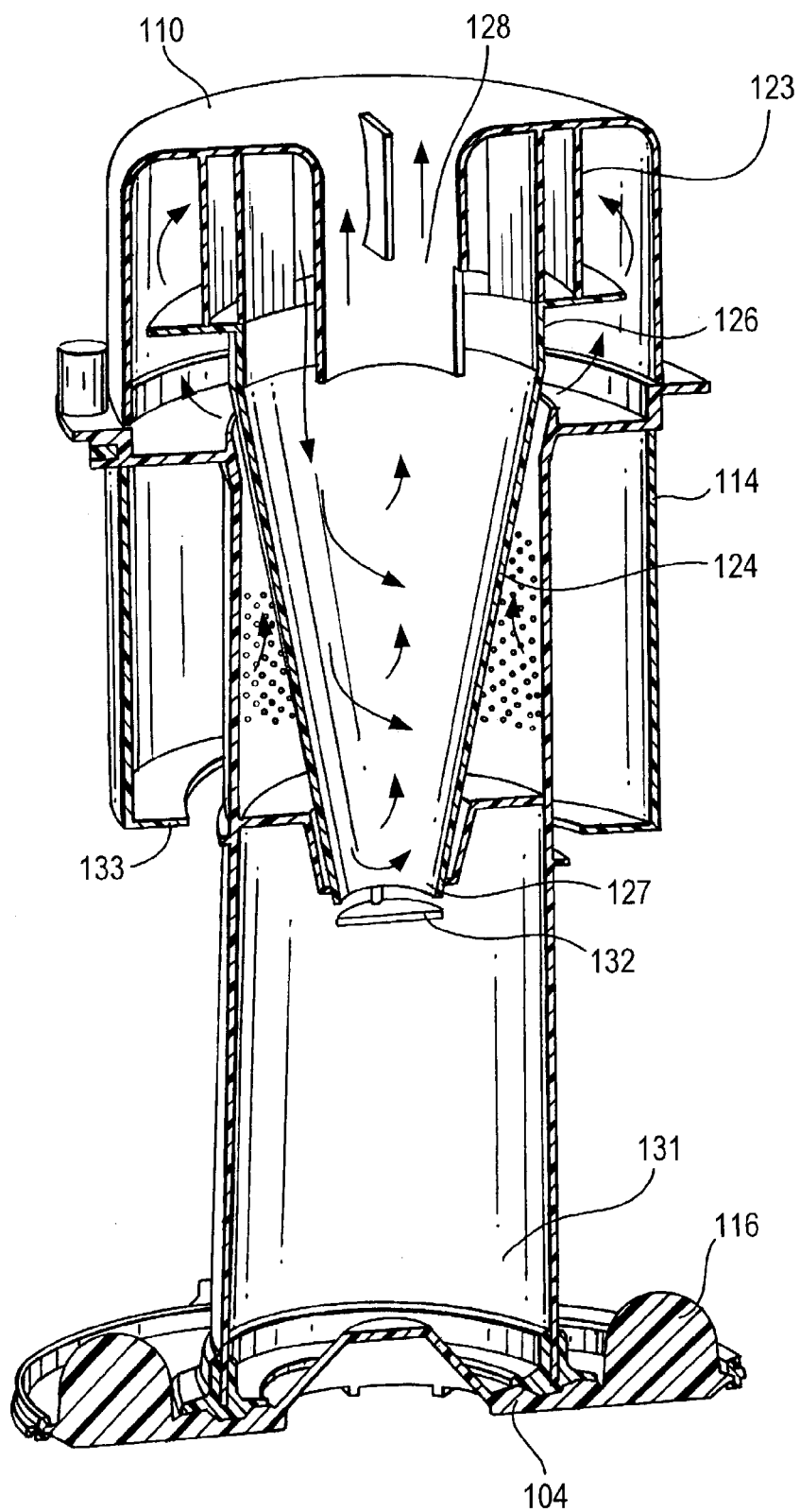
FIG. 6 is a sectional view of the dirt collection and separation device of FIGS. 3–5 taken along line 6—6 of FIG. 3.
Figure 7:
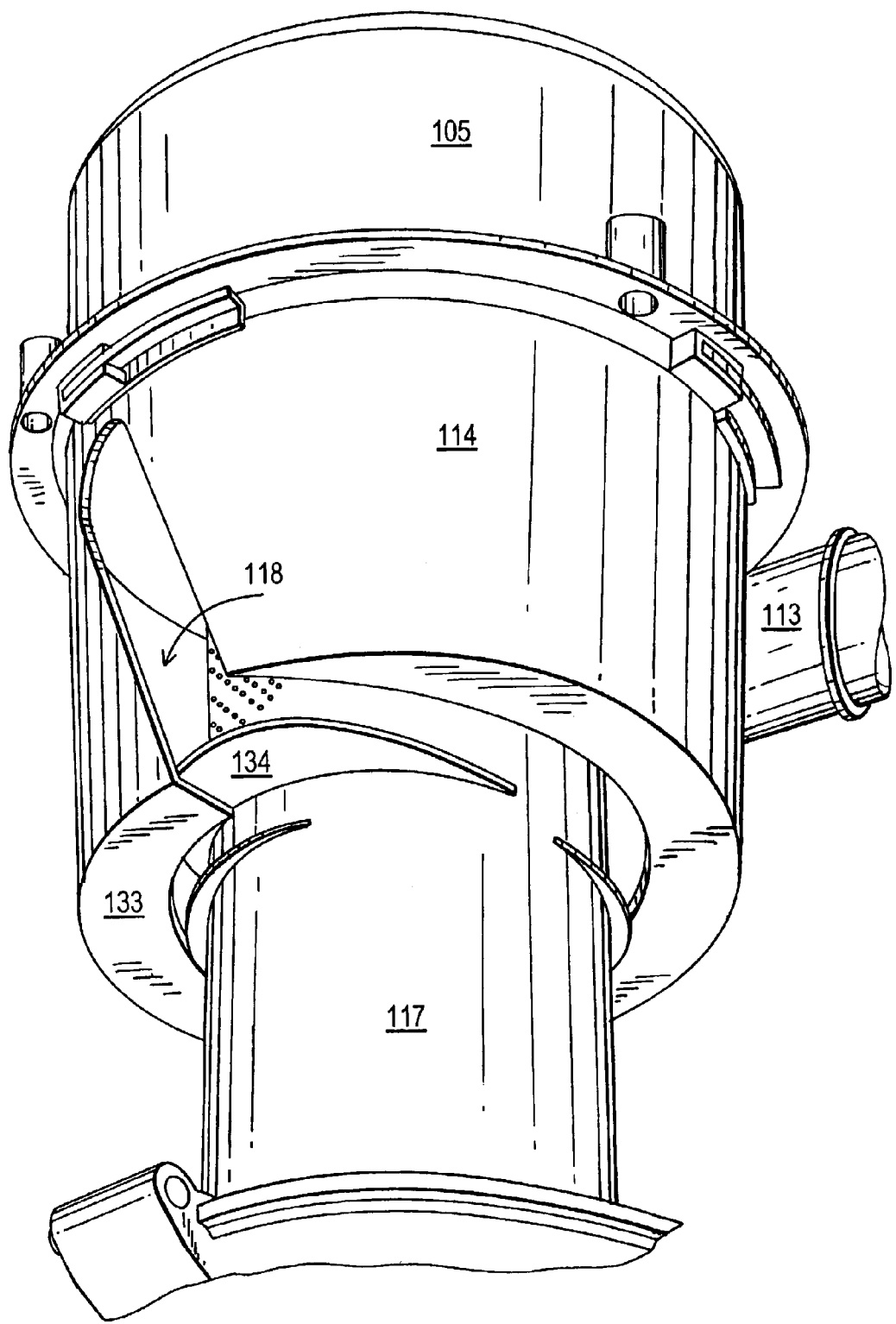
FIG. 7 is a perspective view of the first stage separation zone of the device of FIGS. 3–6.

FIG. 5 is a cross-sectional view of the dirt separation elements contained in dirt separation and collection container 101. These include a first stage separation zone 114 that is a cylindrical baffle or shroud mounted about the central axis of vessel 102 and extending only a portion of the length of vessel sidewall 103. Air entering the first stage separator rotates in the annular space between baffle 114 and column 117 with large dirt particles expelled through an inclined slot 118 shown in FIGS. 4 and 7. Expelled particles are collected on the base 104 of vessel 102. A number of paddles or baffles 116 are placed on the inside surface of base 104 to prevent re-entrainment of dirt during operation of the separation device.

Figure 8:
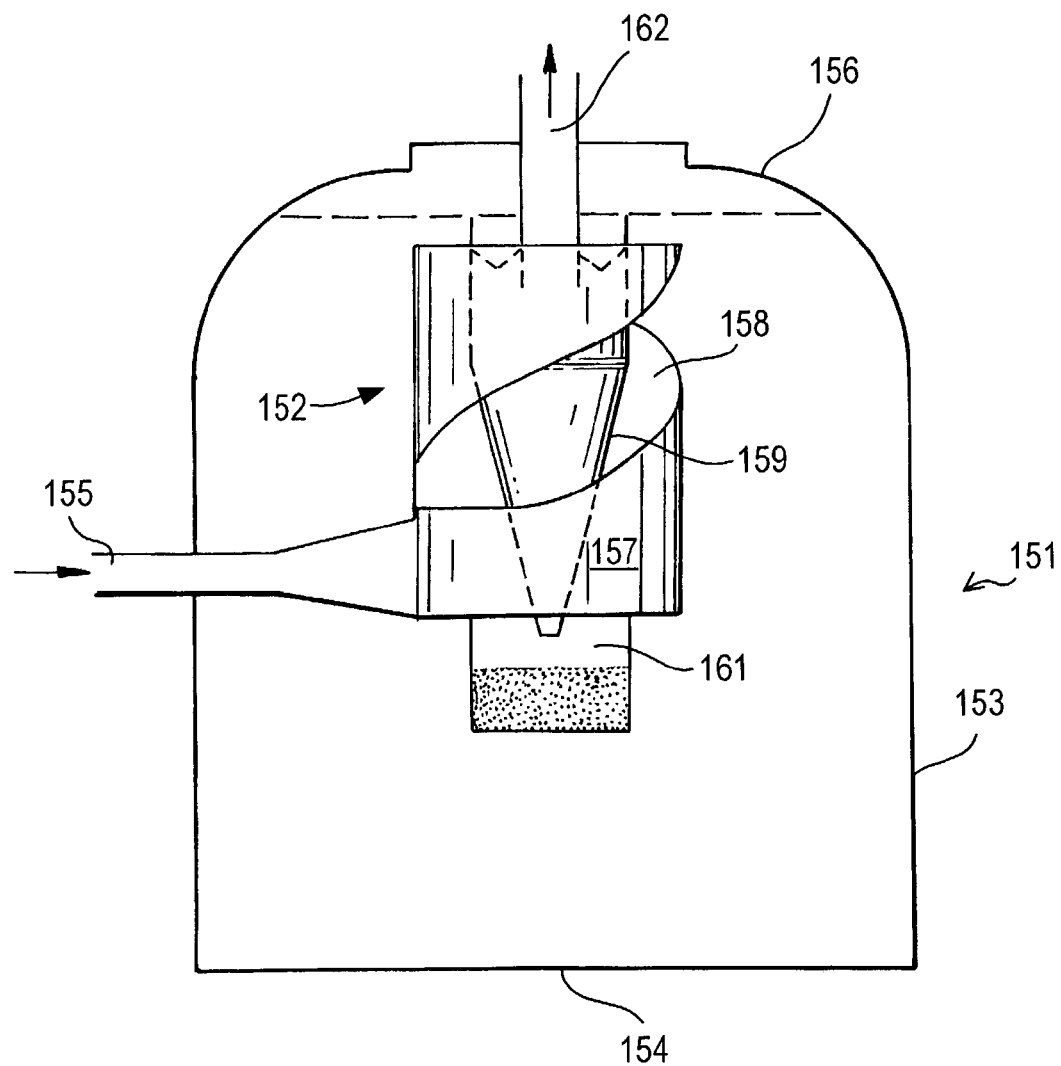
FIG. 8 is a schematic view of a dirt separation and collection device with slotted first stage separation zone in accordance with another embodiment of the invention.

Air circulating in first stage separator 114 passes through a section of column 114 having a plurality of holes 119 or a screen mesh. It then travels upwardly to a series of directional vanes 123 in a domed vane cover 110 and is directed into a second stage frusto-conical separator 124 coaxially oriented within vessel 102. Second stage conical separator 124 has a large cone opening 126 at the top and a smaller cone opening 127 at the bottom. The separation elements may be oriented in any direction so that the second stage separation zone may be inverted as shown in the embodiment shown in FIG. 8.9.

Air then rotates downwardly along the inside wall of cone 124 and then turns upwardly to exit through an outlet 128 and passes through exhaust or outlet conduits 129 formed on the outside of sidewall 103 of vessel 102. Fine dirt is expelled through lower cone opening 127 and collected in an isolated collection zone 131 at the base of column 117. Exiting clean air then passes along the outside of base 104 through a filter, such as a HEPA filter, to a suction source such as motor fan 6 in the vacuum cleaner of FIG. 1. A vortex baffle 132 is placed at the outside of small cone opening 127 to increase efficiency of the separation in conical separator 124.

In the embodiment illustrated in FIGS. 3–7, slot 118 is shown positioned about 180 degrees from inlet 113 and is inclined in the direction of airflow from the upper portion of baffle wall 114 to the bottom portion. Slot 118 in baffle wall 114 is shown at an angle of about 30 degrees from vertical inclined in the direction of flow. The angle of incline may vary from 0 to 60 degrees. A wide variety of shapes and orientation of the slot may be utilized. For example, the slot may be a spiral extending about a portion of or the entire circumference of the cylindrical wall, or may be an incline as shown. It may also be inclined or spiraled in the opposite direction.

Baffle wall 114 is also formed with an inwardly facing lower flange 133 that does not extend to central column 117. Flange 133 together with a helical vane 134 on central column 117 prevents re-entrainment of dirt into first stage separator 114.

During operation coarse particles and fibers are separated from the dirty inlet air in first stage separator 114. These coarse particles are collected in the base of vessel 102. Fine dirt particles separated in second stage cyclonic separator 124 are collected in second stage collection zone 131.

Dirt separation and collection chamber 101 was designed specifically to be interchangeable and usable with the vacuum cleaner as illustrated in FIGS. 1 and 2. Here, dirty air enters towards the middle to upper portion of vessel 102 and exits through cap 106 and is transported to motor fan 6 at the base of main body 1.

The concept of a first stage separation zone having a slotted baffle in accordance with the invention is suitable for a wide variety of machine configurations. These include entry in the mid-point of a collection chamber into the lower portion of a first stage separator and passing into the upper portion of a conical separator where dirty air travels downward and exhausts at the upper portion of the separation and collection chamber. This configuration is similar to the embodiment of FIGS. 3–7 and is illustrated in schematic in FIG. 8. In this embodiment, a dirt separation and collection chamber 151 includes a first separation zone or chamber 152, a cylindrical sidewall 153, a base 154, an upper portion or cap 156 and a dirty air inlet 155. First stage separator is formed of a cylindrical wall 157 extending only a portion of the length of sidewall 153 and having a slotted spiral 158 through which coarse particles and fibrous materials are expelled into the outer annular portion of vessel 151. Fine particles are separated a second stage conical separator 159 and are collected in an isolated dirt collection chamber 161. Clean air exhaust at an outlet 162 formed in cap 156.

Figure 9:
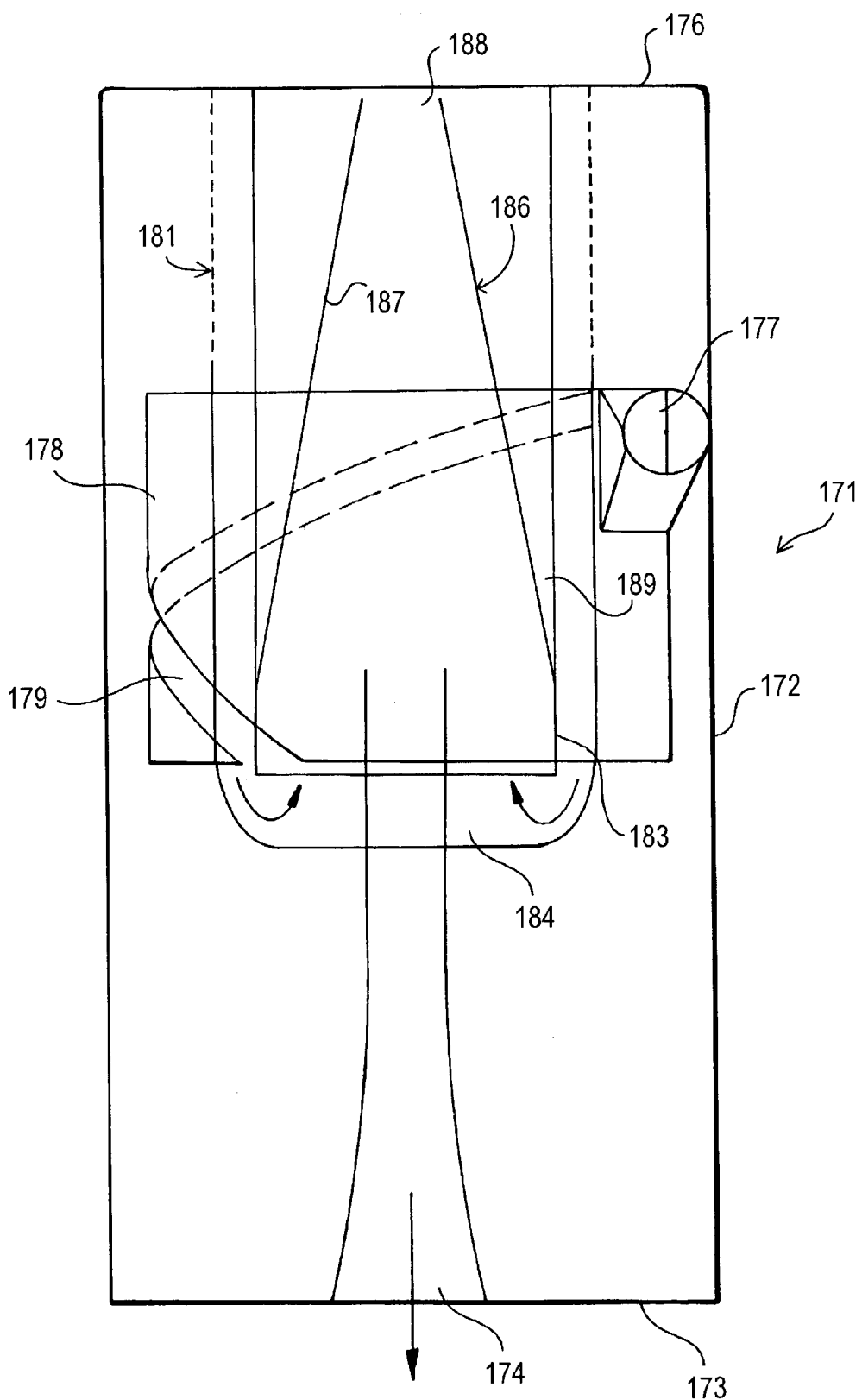
FIG. 9 is a schematic view of a slotted first stage separation zone constructed and arranged in accordance with yet another embodiment of the invention.

Referring now to FIG. 9, a further embodiment of a dirt separation and collection device constructed and arranged in accordance with the invention is shown in schematic. Here, a dirt separation and collection chamber 171 includes a cylindrical sidewall 172, a base 173 having a central outlet 174 and a top wall 176. A dirty air inlet 177 enters a first stage separator formed with a baffle 178 that is formed with a slotted spiral 179 for separating coarse particles from inlet air. Large dirt particles are collected within the outer portion of collection chamber 171.

Air exiting baffle 178 passes through a perforated screen 181 where it is directed into a circular channel 183 and passes through vanes 184 before entering an inverted conical second stage cyclone separator 186 having an inner wall 187 and an upper opening 188 spaced from top wall 176. Dirty air circulates helically along the surface of inner wall 187 with fine dirt particles being expelled out of small cone opening 188 into a cavity 189 before returning downward through the axis of second stage separator 186 to exhaust 174.

In view of the fact that air enters mid-way into chamber 171 and exhausts at the base, such a separation and collection chamber would also be suitable for use with a vacuum cleaner 1 of FIGS. 1 and 2. Collected dirt is removed by top wall 176 and base 173.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention that as a matter of language, might be said to fall therebetween.

What is claimed is:

1. A device for separating and collecting dirt from an air stream, comprising:
    an outer elongated container having a cylindrical sidewall, a bottom and a top;
    an inlet formed in the sidewall;
    a first stage separation zone formed from a cylindrical baffle disposed in the interior of the cylindrical sidewall of the container and spaced therefrom with the inlet entering the interior of the baffle tangentially to the inner surface;
    a second separation zone including a frusto-conical cyclone having an inlet opening larger than the opposed opening of the cone;
    the second stage separation zone disposed coaxially within the first stage separation zone;
    the baffle including a single inclined slot for allowing coarse particles to pass therethrough and be collected in the outer portion of the elongated container.

2. The separator device of claim 1, further including a plurality of vanes disposed within the cylindrical container for directing air into the larger opening of the frusto-conical separator.

3. The separator device of claim 1, further including a central column positioned in the container about the cyclone and isolated from the coarse particles collected in the outer portion of the container for collecting fine dirt particles separated in the cyclone.

4. The separator device of claim 3, wherein the cylindrical column inside the cylindrical baffle has a plurality of holes to screen large particle from entering the second stage separator.

5. The separator device of claim 1, wherein the cylindrical baffle extends from the top of the sidewall of the container and extends a portion of the height of the sidewall.

6. The separator device of claim 1, further including a vortex baffle located at the outside of the small opening of the cyclone.

7. The separator device of claim 1, further including a plurality of paddles positioned on the inside of the base in the outer portion of the contained to prevent collected dirt particles from becoming re-entrained in the air stream.

8. A vacuum cleaner housing including a suction source and a dirty air inlet and having a cavity for receiving a dirt separation and collection container, the container comprising:
    an outer elongated container having a cylindrical sidewall, a bottom and a top;
    an inlet formed in the sidewall;
    a first stage separation zone formed from a cylindrical baffle disposed in the interior of the cylindrical sidewall of the container and spaced therefrom with the inlet entering the interior of the baffle tangentially to the inner surface;
    a second separation zone including a frusto-conical cyclone having an inlet opening larger than the opposed opening of the cone;
    the second stage separation zone disposed coaxially within the first stage separation zone;
    the baffle including a single inclined slot for allowing coarse particles to pass therethrough and be collected in the outer portion of the elongated container.

* * * * *